United States Patent
Zhao et al.

(10) Patent No.: US 12,432,700 B2
(45) Date of Patent: Sep. 30, 2025

(54) INITIAL ACCESS METHOD, CONTROLLED DEVICE AND CONTROLLING DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Zhi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 374 days.

(21) Appl. No.: 17/964,408

(22) Filed: Oct. 12, 2022

(65) Prior Publication Data

US 2023/0044083 A1 Feb. 9, 2023

Related U.S. Application Data

(63) Continuation of application No. PCT/CN2020/088994, filed on May 7, 2020.

(51) Int. Cl.
*H04W 74/0833* (2024.01)
*H04W 72/04* (2023.01)
(Continued)

(52) U.S. Cl.
CPC ........ *H04W 72/04* (2013.01); *H04W 74/0833* (2013.01); *H04W 74/0836* (2024.01); *H04W 74/0838* (2024.01)

(58) Field of Classification Search
CPC ............... H04W 74/0833; H04W 72/04
See application file for complete search history.

(56) References Cited

U.S. PATENT DOCUMENTS

| | | | |
|---|---|---|---|
| 2010/0124188 A1* | 5/2010 | Wu | H04W 74/002 370/328 |
| 2013/0272241 A1* | 10/2013 | Ohta | H04W 74/006 370/329 |

(Continued)

FOREIGN PATENT DOCUMENTS

| | | | |
|---|---|---|---|
| CN | 104981022 A | 10/2015 | |
| CN | 108024385 A | 5/2018 | |

(Continued)

OTHER PUBLICATIONS

Notice of Allowance issued in corresponding Japanese application No. 2022-567416, mailed Jun. 4, 2024.

(Continued)

*Primary Examiner* — Kenny S Lin
(74) *Attorney, Agent, or Firm* — BAYES PLLC

(57) ABSTRACT

Provided are an initial access method, a controlled device and a controlling device, which can realize initial access in short-range communication without depending on a PRACH preamble. The initial access method comprises: a controlled device acquiring an initial access resource; the controlled device sending, on the initial access resource, initial access information to a controlling device; and the controlled device monitoring access feedback information sent by the controlling device, wherein the access feedback information is used for indicating that the controlled device has successfully accessed the controlling device.

16 Claims, 4 Drawing Sheets

(51) Int. Cl.
*H04W 74/0836* (2024.01)
*H04W 74/0838* (2024.01)

(56) References Cited

U.S. PATENT DOCUMENTS

| | | | |
|---|---|---|---|
| 2016/0100305 A1 | 4/2016 | Karampatsis et al. | |
| 2016/0262182 A1* | 9/2016 | Yang | H04W 4/70 |
| 2017/0238314 A1* | 8/2017 | Zhang | H04W 72/23 370/336 |
| 2018/0124830 A1* | 5/2018 | Lin | H04W 74/085 |
| 2019/0335515 A1* | 10/2019 | Chen | H04W 76/11 |
| 2020/0107377 A1* | 4/2020 | Lee | H04W 72/23 |
| 2021/0126685 A1* | 4/2021 | Kang | H04B 7/0608 |
| 2021/0176797 A1* | 6/2021 | Kang | H04W 56/005 |
| 2022/0015061 A1* | 1/2022 | Kim | H04W 68/005 |
| 2022/0086824 A1* | 3/2022 | Kundu | H04B 1/713 |
| 2022/0167428 A1* | 5/2022 | Mu | H04W 72/51 |
| 2022/0346152 A1* | 10/2022 | Fan | H04W 74/0833 |

FOREIGN PATENT DOCUMENTS

| | | |
|---|---|---|
| CN | 108282301 A | 7/2018 |
| CN | 108541074 A | 9/2018 |
| CN | 109121207 A | 1/2019 |
| CN | 109314654 A | 2/2019 |
| CN | 109892000 A | 6/2019 |
| CN | 106105366 B | 10/2019 |
| CN | 110495192 A | 11/2019 |
| CN | 110769505 A | 2/2020 |
| CN | 110831230 A | 2/2020 |
| CN | 110933768 A | 3/2020 |
| CN | 110972322 A | 4/2020 |
| WO | 2015072789 A1 | 5/2015 |
| WO | 2018170702 A1 | 9/2018 |

OTHER PUBLICATIONS

Priority Review issued in corresponding Chinese application No. 202310204131.0, mailed Jul. 31, 2024.
First Office Action issued in corresponding Indian application No. 202217058935, mailed Aug. 9, 2024.
First Office Action issued in corresponding Chinese application No. 202310204131.0, mailed Aug. 22, 2024.
International Search Report issued in International application No. PCT/CN2020/088994, mailed Jan. 27, 2021.
Written Opinion of the International Searching Authority issued in International application No. PCT/CN2020/088994, mailed Jan. 27, 2021.
First Office Action issued in corresponding Japanese application No. 2022-567416, Jan. 16, 2024.
Notice of Allowance issued in corresponding European application No. 20934866.3, mailed Jan. 24, 2024.
Source: ZTE; Title: Support for transmission in preconfigured UL resources for MTC 3GPP TSG RAN WG1 Meeting #96 R1-1901858 Athens, Greece, Feb. 25-Mar. 1, 2019.
Source: Samsung; Title: Discussion on transmission in preconfigured UL resources for MTC 3GPP TSG RAN WG1 Meeting #95 R1-1812940 Spokane, USA, Nov. 12-16, 2018.
Source: Qualcomm Incorporated; Title: Support for transmission in preconfigured UL resources 3GPP TSG RAN WG1 Meeting 96b R1-1904518 Xi'an, China, Apr. 8-Apr. 12, 2019.
Source: ZTE Corporation, Sanechips; Title: Remaining issues for UL aspects of D-PUR in Idle 3GPP TSG-RAN2 meeting#106 R2-1905642 Reno, Nevada, USA, May 13-17, 2019.
Source: Alcatel-Lucent; Title: UEid in message 3 and contention resolution 3GPP TSG RAN WG2 #61 R2-081353 Feb. 11-15, 2008 Sorrento, Italy.
Source: Sierra Wireless; Title: LTE-M Pre-configured UL Resources Design Considerations 3GPP TSG RAN WG1 Meeting #96bis R1-1905532 Xi'an, China, Apr. 8-12, 2019.
Extended European Search Report issued in corresponding European application No. 20934866.3, mailed Apr. 3, 2023.
Request for the Submission of an Opinion issued in corresponding Korean Application No. 10-2022-7040532, mailed on May 27, 2025, 5 pages.
LTE-M Pre-configured UL Resources Design Considerations. Agenda item: 6.2.1.2 Support for transmission in preconfigured UL resources, Source: Sierra Wireless, 3GPP TSG RAN WG1 Meeting #94bis R1-1810489, Chengdu, China, Oct. 8-12, 2018, 9 pages.
Transmission in preconfigured UL resources, Agenda item: 6.2.1.2, Source: Nokia, Nokia Shanghai Bell, 3GPP TSG RAN WG1 Meeting #94 R1-1808431, Gothenburg, Sweden, Aug. 20- 24, 2018, 4 pages.
Email discussion [104#43][eMTC & NB-Iot R16] D-PUR report, Agenda Item: 12.2.4, Source: Sierra Wireless, 3GPP TSG-RAN WG2 Meeting#105bis R2-1905204, Xi'An, China, Apr. 8-12, 2019, 45 pages.

* cited by examiner

INITIAL ACCESS METHOD, CONTROLLED DEVICE AND CONTROLLING DEVICE

CROSS-REFERENCE TO RELATED APPLICATION

The present application is a continuation of International Application No. PCT/CN2020/088994, filed on May 7, 2020, the entire disclosure of which is incorporated herein by reference in its entirety.

TECHNICAL FIELD

Embodiments of the present disclosure relate to the field of communication, and more particularly, to an initial access method, a controlled device and a controlling device.

BACKGROUND

In cellular communications, initial access is realized by relying on a Physical Random Access Channel (PRACH) preamble. In short-range communications, a distance between a controlling device and a controlled device is very short. After the controlled device obtains downlink synchronization by receiving a synchronization signal sent by the controlling device, it may perform reception and transmission according to downlink timing. Upon an uplink transmission, there is no need to determine uplink transmission timing according to uplink Timing Advance (TA) sent by the controlling device. That is, there is a substantive difference between the short-range communications and the cellular communications, and how to realize initial access in the short-range communications is an urgent problem to be solved.

SUMMARY

Embodiments of the present disclosure provide an initial access method, a controlled device, and a controlling device, which can realize initial access in short-range communications without relying on a PRACH preamble.

In a first aspect, there is provided an initial access method, and the method includes:
  acquiring, by a controlled device, an initial access resource;
  sending, by the controlled device, initial access information to a controlling device on the initial access resource; and
  monitoring, by the controlled device, access feedback information sent by the controlling device, wherein the access feedback information is used for indicating that the controlling device has been successfully accessed by the controlled device.

In a second aspect, there is provided an initial access method, and the method includes:
  receiving, by a controlling device, initial access information sent by a controlled device on an initial access resource; and
  sending, by the controlling device, access feedback information to the controlled device, wherein the access feedback information is used for indicating that the controlling device has been successfully accessed by the controlled device.

In a third aspect, there is provided a controlled device, configured to perform the method in the first aspect or each implementation thereof as described above.

Specifically, the controlled device includes functional modules configured to perform the method in the first aspect or each implementation thereof as described above.

In a fourth aspect, there is provided a controlling device, configured to perform the method in the second aspect or each implementation thereof as described above.

Specifically, the controlling device includes functional modules configured to perform the method in the second aspect or each implementation thereof as described above.

In a fifth aspect, there is provided a controlled device, including a processor and a memory. The memory is configured to store a computer program, and the processor is configured to call and run the computer program stored in the memory to perform the method in the first aspect or each implementation thereof as described above.

In a sixth aspect, there is provided a controlling device, including a processor and a memory. The memory is configured to store a computer program, and the processor is configured to call and run the computer program stored in the memory to perform the method in the second aspect or each implementation thereof as described above.

In a seventh aspect, there is provided an apparatus for implementing the method in any one of the first aspect to the second aspect or each implementation thereof as described above.

Specifically, the apparatus includes: a processor, configured to call and run a computer program from a memory, so that a device installed with the apparatus performs the method in any one of the first aspect to the second aspect or each implementation thereof as described above.

In an eighth aspect, there is provided a computer-readable storage medium, configured to store a computer program that causes a computer to perform the method in any one of the first aspect to the second aspect or each implementation thereof as described above.

In a ninth aspect, there is provided a computer program product, including computer program instructions, which cause the computer to perform the method in any one of the first aspect to the second aspect or each implementation thereof as described above.

In a tenth aspect, there is provided a computer program which, when run on a computer, causes the computer to perform the method in any one of the first aspect to the second aspect or each implementation thereof as described above.

Through the above technical solutions, the controlled device sends the initial access information to the controlling device on the initial access resource, and monitors the access feedback information sent by the controlling device, so as to realize the initial access. That is, the controlled device can realize the initial access in the short-range communications without relying on the PRACH preamble, so as to avoid disadvantages of establishing an initial connection through PRACH, shorten an establishment latency of the initial connection, reduce cost of the controlled device and the controlling device, and improve utilization of wireless resources.

DETAILED DESCRIPTION

The technical solutions in embodiments of the present disclosure will be described below in combination with the drawings in embodiments of the present disclosure. Obviously, the described embodiments are part of embodiments of the present disclosure, rather than all the embodiments. For embodiments in the present disclosure, all other embodiments acquired by a person of ordinary skill in the art without creative work shall belong to the protection scope of the present disclosure.

In a conventional cellular communication system, initial access may be implemented in two modes: a contention-based random access procedure, and a contention-free random access procedure. In addition, the initial access may also be implemented through a two-step random access (2-step RACH) procedure.

Figure 1:
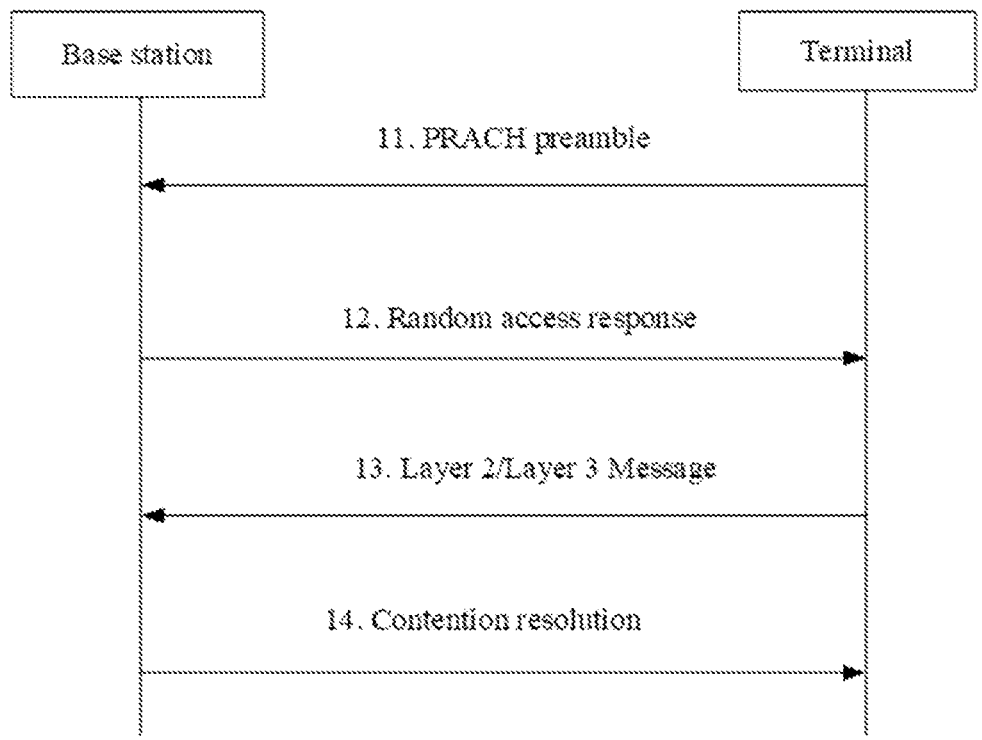
FIG. 1 is a schematic flowchart of a contention-based random access procedure provided by the present disclosure.

The contention-based random access procedure may be implemented through the following steps 11 to 14, which is specifically shown in FIG. 1.

In the step 11, a terminal sends a PRACH preamble (Msg1) to a base station.

In the step 11, the terminal selects a PRACH preamble from a PRACH preamble set allocated by the base station, and the PRACH preamble set is indicated by the base station through a system message.

In the step 12, the base station sends a random access response (Msg2) to the terminal.

It should be noted that the Random Access Response (RAR) is sent by the base station to the terminal through a Physical Downlink Shared Channel (PDSCH), and is used for indicating that a Physical Downlink Control Channel (PDCCH) sent by the PDSCH is scrambled by a Random Access Radio Network Temporary Identity (RA-RNTI). The RA-RNTI is related to a time-frequency resource position where the PRACH is sent in the step 11. If multiple terminals use the same time-frequency position to send the PRACH, each terminal will receive the RAR.

The RAR includes information such as an Identity (ID) of the PRACH in the step 11, uplink transmission timing adjustment information, an uplink transmission resource grant, a Cell Radio Network Temporary Identity (C-RNTI). The uplink transmission resource grant is used to send a Layer 2/Layer 3 Message in the step 13. The RAR needs to be sent within a time window, and the time window is configured by the base station. In general, an interval between the window and an end time of the PRACH preamble is 2-4 milliseconds.

In the step 13, the terminal sends the Layer 2/Layer 3 Message (Msg3) to the base station.

The Layer 2/Layer 3 Message carries information such as a Radio Resource Control (RRC) connection request, tracking area update, scheduling request. In addition, if the terminal already has the C-RNTI allocated by the base station, the Layer 2/Layer 3 Message will also carry this C-RNTI; otherwise, the Layer 2/Layer 3 Message will carry an initial ID of the terminal. The existing C-RNTI of the terminal and the initial ID of the terminal is used in conflict resolution in the step 14. If the multiple terminals receive the same RAR in the step 12, the multiple terminals will also send Msg3 on the same video resource in this step, and a collision will occur at the base station side, which will eventually lead to all the terminals failing to succeed access.

In the step 14, it is conflict resolution (Msg4).

If Msg3 contains the existing C-RNTI of the terminal, the PDCCH scheduling the transmission of Msg4 will be scrambled by this C-RNTI. In this case, if the terminal detects Msg4, the terminal considers that the access is successful. If Msg3 does not contain the existing C-RNTI of the terminal but the initial ID of the terminal, the PDCCH that schedules Msg4 will be scrambled by a C-RNTI indicated in the RAR. In this case, Msg4 should carry the initial ID of the terminal in Msg3. Then, if the terminal detects Msg4, and the initial ID of the terminal in Msg4 is the same as that carried when sending Msg3, the terminal considers that the access is successful.

Figure 2:
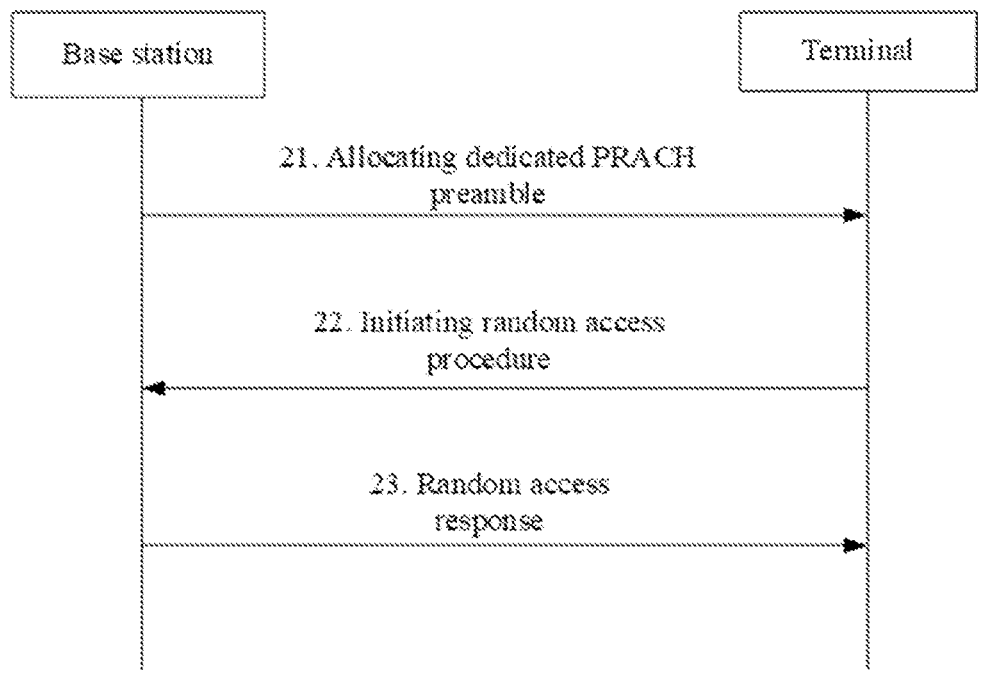
FIG. 2 is a schematic flowchart of a contention-free random access procedure provided by the present disclosure.

It should be noted that, in the contention-based random access procedure, a collision may be caused due to the multiple terminals selecting the same PRACH for resource transmission, thereby introducing an unpredictable latency. In a cellular communication system, procedures such as cell handover and downlink transmission recovery have high requirements on the latency, and the contention-based random access procedure cannot effectively meet the requirements of such low-latency services. The collision may be effectively avoided by allocating a dedicated PRACH preamble to the terminal, thereby reducing an access latency of the terminal, and this is called the contention-free random access procedure. The contention-free random access procedure may be implemented through steps 21 to 23 as follows, which are specifically shown in FIG. 2. In this procedure, the base station allocates the dedicated PRACH preamble to the terminal through RRC signaling or PDCCH, and the terminal uses the dedicated PRACH preamble to initiate a random access procedure, and successfully accesses the base station after receiving the RAR sent by the base station.

Figure 3:
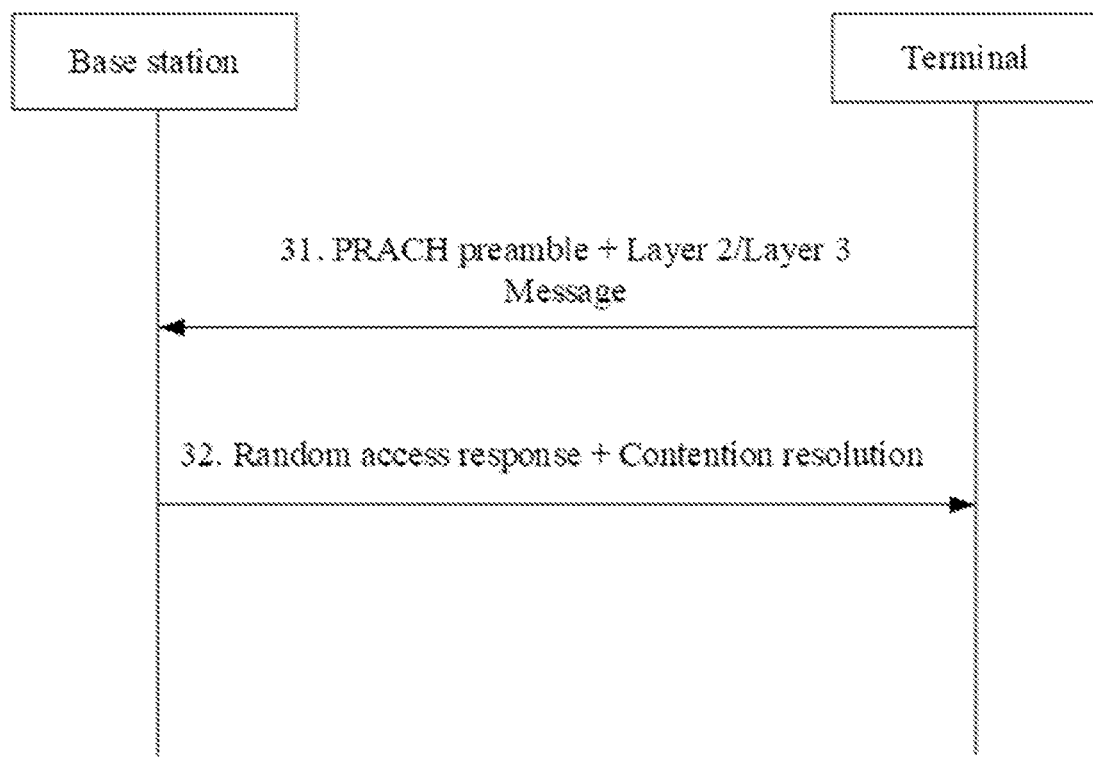
FIG. 3 is a schematic flowchart of a two-step random access procedure provided by the present disclosure.

It should also be noted that the contention-free random access procedure requires the terminal to be in an RRC Connected state, in order to receive the dedicated PRACH preamble allocated by the base station, which limits application scenarios of this function. The two-step random access procedure instead provides an effective way to allow all terminals in the RRC Connected state to quickly access the base station. The two-step based random access procedure may be implemented through steps 31 to 32 as follows, which are specifically shown in FIG. 3. In the two-step random access procedure, the terminal still needs to select a preamble from the PRACH preamble set configured by the base station. However, a difference from the previous two random accesses is that, after the PRACH preamble is sent, the terminal sends the Layer 2/Layer 3 Message before receiving the RAR sent by the base station, and the function of the Layer 2/Layer 3 Message is similar to Msg3 in the contention-based random access procedure (the step 31). If the terminal then successfully receives a random access feedback and a contention resolution message sent by the base station, whose functions are equivalent to Msg2 and Msg4 in the contention-based PRACH random access procedure, the terminal successfully accesses the base station (the step 32).

It should be noted that an initial access procedure relies on the PRACH preamble, which increases complexity of the device implementation and the initial connection establishment latency, and the base station needs to reserve the time-frequency resource for PRACH, which also affects a spectral efficiency of the communication system.

Figure 4:
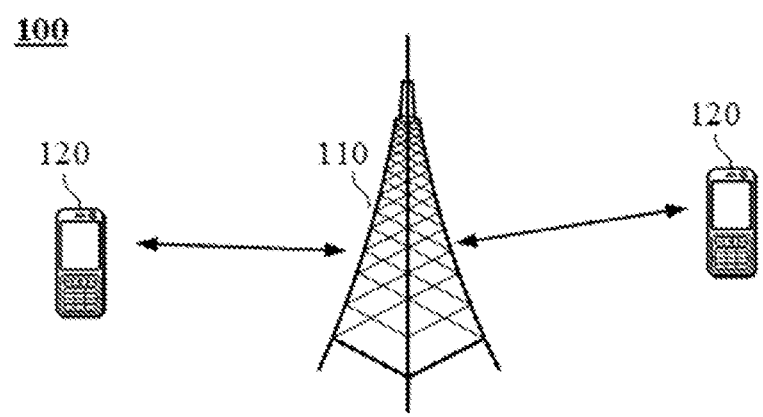
FIG. 4 is a schematic diagram of an architecture of a short-range communication system provided by an embodiment of the present disclosure.

Embodiments of the present disclosure may be applied to a short-range communication system. For example, a short-range communication system 100 to which embodiments of the present disclosure are applied is shown in FIG. 4. The short-range communication system 100 may include a controlling device 110 (or referred to as a control node), and the controlling device 110 may be a device in communication with a controlled device 120 (or referred to as a controlled terminal). The controlling device 110 may provide communication coverage for a particular geographic area, and may communicate with controlled devices located within the coverage area.

FIG. 4 exemplarily shows one controlling device and two controlled devices. Optionally, the short-range communication system 100 may include a plurality of controlling devices and the coverage area of each controlling device may include other numbers of controlled devices, which is not limited in embodiments of the present disclosure.

Optionally, the short-range communication system 100 may further include other network entities, which are not limited in embodiments of the present disclosure.

It should be understood that, a device having a communication function in the network/system according to embodiments of the present disclosure may be referred to as a communication device. Taking the short-range communication system 100 shown in FIG. 4 as an example, the communication device may include the controlling device 110 and the controlled device 120 with the communication function. The controlling device 110 and the controlled device 120 may be specific devices described above, and details are not repeated here. The communication device may further include other devices in the short-range communication system 100, which are not limited in embodiments of the present disclosure.

It should be understood that the terms "system" and "network" herein may often be interchanged herein. The term "and/or" herein only indicates an association relationship that describes associated objects, and represents that there may be three relationships. For example, A and/or B may represent cases where A exists alone, A and B exist simultaneously, and B exists alone. In addition, the character "/" herein generally indicates that proceeding and following objects associated thereby are in an "or" relationship.

The controlled device in embodiments of the present disclosure may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing devices connected to a wireless modem, a vehicle-mounted device, a wearable device, or a terminal device in a next generation communication system.

By way of example and not limitation, in embodiments of the present disclosure, the controlled device may be a wearable device. The wearable device may also be called a wearable intelligent device, which is a general term of wearable devices designed and developed intelligently on daily wear using wearable technology, such as glasses, gloves, a watch, clothing and shoes. The wearable device is a portable device that is worn directly on a body or integrated into a user's clothes or accessories. The wearable device is not only a hardware device, but also implements powerful functions through software support, data interaction and cloud interaction. Generalized wearable intelligent devices include a device with full features, a large size, and full or partial functions which may be implemented without relying on a smart phone, for example, a smart watch or smart glasses, as well as a device that is only focused on a certain application function and needs to be cooperated with other devices such as a smart phone, for example, a smart bracelet and a smart jewelry for various physical sign observations.

In the short-range communication system, similar to the existing cellular network communication system, a function of the controlling device is similar to that of the base station in the cellular network, which is responsible for functions such as sending synchronization signal, sending broadcast message, access control, data transmission and reception, sending higher layer information and so on; while the controlled device is responsible for detecting synchronization signal, receiving broadcast message, sending and receiving data according to scheduling of the controlling device, receiving higher layer information and so on.

In embodiments of the present disclosure, for the convenience of description, transmission from the controlling device to the controlled device is referred to as downlink, and transmission from the controlled device to the controlling device is referred to as uplink.

In the short-range communication system, a distance between the controlling device and the controlled device is very short. After the controlled device obtains downlink synchronization by receiving the synchronization signal sent by the controlling device, it may perform reception and transmission according to downlink timing. Upon an uplink transmission, there is no need to determine uplink transmission timing according to uplink TA sent by the controlling device.

It can be seen from the above analysis that in the short-range communication system, the controlled device does not need to establish an initial connection with the controlling device through PRACH. In order to avoid an adverse effect brought by the PRACH preamble on the initial access, the present disclosure proposes a solution for establishing an initial connection between the controlled device and the controlling device, which can realize the initial access in the short-range communications without relying on the PRACH preamble.

The technical solutions of the present disclosure are described in detail below through specific embodiments.

Figure 5:
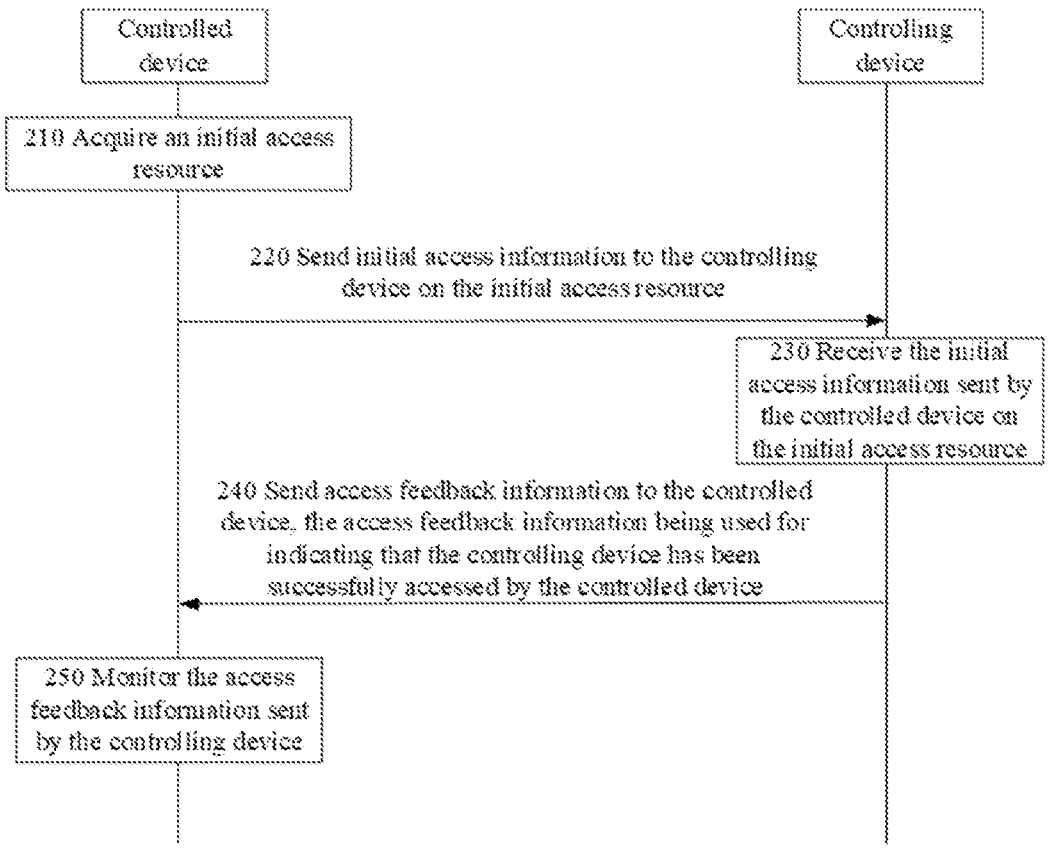
FIG. 5 is a schematic flowchart of an initial access method provided according to an embodiment of the present disclosure.

FIG. 5 is a schematic flowchart of an initial access method 200 according to an embodiment of the present disclosure. As shown in FIG. 5, the method 200 may include but is not limited to the following contents.

In S210, a controlled device acquires an initial access resource.

In S220, the controlled device sends initial access information to a controlling device on the initial access resource.

In S230, the controlling device receives the initial access information sent by the controlled device on the initial access resource.

In S240, the controlling device sends access feedback information to the controlled device, and the access feedback information is used for indicating that the controlling device has been successfully accessed by the controlled device.

In S250, the controlled device monitors the access feedback information sent by the controlling device.

In other words, in embodiments of the present disclosure, the controlled device can realize the initial access in the short-range communications without relying on the PRACH preamble, so as to avoid disadvantages of establishing an initial connection through PRACH, shorten an establishment latency of the initial connection, reduce cost of the controlled device and the controlling device, and improve utilization of wireless resources.

It should be noted that the initial access information is used to request access to the controlling device. In other words, the controlled device sends the initial access information to establish an initial connection with the controlling device.

In embodiments of the present disclosure, uplink refers to a link in which the controlled device acts as a sender and the controlling device acts as a receiver, and downlink refers to a link in which the controlled device acts as the receiver and the controlling device acts as the sender.

Optionally, in embodiments of the present disclosure, the initial access resource includes an uplink data channel resource or an uplink control channel resource.

The uplink data channel resource and the uplink control channel resource are different from each other in terms of at least one of a physical resource granularity, a Modulation and Coding Scheme (MCS), a spreading mode, and a reference signal pattern.

It should be noted that the uplink data channel is similar to a Physical Uplink Shared Channel (PUSCH) in the cellular network, and the uplink control channel is similar to a Physical Uplink Control Channel (PUCCH) in the cellular network.

Optionally, in embodiments of the present disclosure, the access feedback information is carried by a downlink data channel and/or a downlink control channel.

The downlink data channel and the downlink control channel are different from each other in terms of at least one of the physical resource granularity, the modulation and coding scheme, the spreading mode, and the reference signal pattern.

It should be noted that the downlink data channel is similar to a Physical Downlink Shared Channel (PDSCH) in the cellular network, and the downlink control channel is similar to a Physical Downlink Control Channel (PDCCH) in the cellular network.

Optionally, in embodiments of the present disclosure, the access feedback information includes but is not limited to one of the following:

Hybrid Automatic Repeat reQuest (HARQ) feedback information for the uplink control channel or the uplink data channel carrying the initial access information;
  uplink or downlink resource indication information for the controlled device;
  RRC layer configuration information for the controlled device; and
  Non-Access Stratum (NAS) information for the controlled device.

Optionally, in some embodiments, the controlled device may determine whether to retransmit the initial access information according to the HARQ feedback information for the initial access information sent by the controlling device. That is, a HARQ feedback mechanism is introduced to ensure that the controlling device can correctly receive the initial access information.

Optionally, the HARQ feedback information may be Acknowledgement (ACK) or Negative Acknowledgement (NACK).

For example, if the controlling device successfully receives the initial access information, the controlling device feeds back the ACK to the controlled device. In this case, the controlled device determines not to retransmit the initial access information. If the controlling device fails to receive the initial access information, the controlling device feeds back NACK to the controlled device. In this case, the controlled device determines to retransmit the initial access information.

Optionally, in other embodiments, the controlled device continuously sends the initial access information to the controlling device R times on the initial access resource, where R is a positive integer. That is, a continuous transmission mechanism is introduced to ensure that the controlling device can correctly receive the initial access information.

Optionally, R is pre-configured or agreed in protocol, or R is configured by the controlling device.

For example, R is 3. That is, the controlled device continuously sends the initial access information to the controlling device 3 times on the initial access resource.

Optionally, in embodiments of the present disclosure, the controlled device needs to determine a transmission mode of the initial access information in advance.

The transmission mode of the initial access information includes but is not limited to at least one of the following:
  a modulation and coding scheme, a transmission power, a multi-antenna transmission mode.

Optionally, the transmission mode of the initial access information is pre-configured or agreed in protocol, or the transmission mode of the initial access information is configured by the controlling device.

For example, before the initial access, the controlling device indicates the transmission mode of the initial access information to the controlled device in a broadcast mode.

Optionally, in embodiments of the present disclosure, the controlled device may acquire the initial access resource in various ways. For example, the controlled device may acquire the initial access resource by using a method described in at least one of the following examples 1 to 5.

Example 1

The controlled device determines at least one search space according to signaling sent by the controlling device in a broadcast mode, and the controlled device determines the initial access resource by detecting the downlink control channel in the at least one search space.

Accordingly, for the respective controlling device, in Example 1, the controlling device sends the signaling to the controlled device in a broadcast mode. The signaling is used by the controlled device to determine the at least one search space, the at least one search space is used by the controlled device to detect the downlink control channel, and the downlink control channel indicates the initial access resource.

That is, in Example 1, the controlling device may dynamically indicate the initial access resource.

Optionally, in Example 1, in a case where Cyclic Redundancy Check (CRC) of the downlink control channel is scrambled by an identity of the controlled device, the controlled device determines an uplink resource indicated in the downlink control channel as the initial access resource.

It should be noted that the identity of the controlled device is a member identity (ID) of the controlled device, which is similar to a terminal identity in the cellular network.

Optionally, in Example 1, in a case where the CRC of the downlink control channel is scrambled by an identity of a type group to which the controlled device belongs, the controlled device determines an uplink resource, among M uplink resources indicated in the downlink control channel, corresponding to a member index of the controlled device as the initial access resource. M is the number of members included in the type group, and the M uplink resources are in one-to-one correspondence with member indexes in the type group.

It should be noted that type groups may be divided by functions of controlled devices. For example, the controlled devices with display functions are divided into one type group, and the controlled devices with call functions are divided into one type group. In addition, the type groups may also be divided in other ways, which are not limited in the present disclosure.

For example, the correspondence between the M uplink resources and the member indexes of the M members in the type group may be as shown in Table 1 below.

TABLE 1

| Member Index | Identity of uplink resource |
|---|---|
| 0 | 0 |
| 1 | 1 |
| ... | ... |
| M-1 | M-1 |

Example 2

The controlled device determines the initial access resource according to the signaling sent by the controlling device in a broadcast mode.

Accordingly, for the respective controlling device, in Example 2, the controlling device sends the signaling to the controlled device in a broadcast mode, and the signaling is used by the controlled device to determine the initial access resource that is semi-statically configured.

That is, in Example 2, the controlling device may configure the initial access resource in a semi-statical way.

Optionally, in Example 2, an interval between a time domain position where the controlled device receives the signaling and a start position of the initial access resource in time domain is greater than a first threshold and less than a second threshold.

Optionally, in Example 2, the controlled device includes a plurality of time division initial access resources between the first threshold and the second threshold. It should be noted that the plurality of initial access resources may be continuous in time domain, and may also be discontinuous in time domain or partially discontinuous in time domain, which is not limited in the present disclosure.

Optionally, in Example 2, the first threshold and the second threshold are pre-configured or agreed in protocol, or the first threshold and the second threshold are configured by the controlling device.

Optionally, in Example 2, the initial access resources of multiple controlled terminals, that is, an initial access resource set, may be all indicated in the same broadcast message. The initial access resources of the multiple controlled terminals may be multiplexed in time division, frequency division or code division. If the initial access resources of the multiple controlled terminals are all indicated in one broadcast message, it is similar to the dynamic indication mode in the above Example 1, and the controlled device determines the initial access resource according to its own member index or ID.

That is, in Example 1 and Example 2, the controlled device may determine the initial access resource according to the signaling sent by the controlling device.

Optionally, in Example 1 and Example 2, the signaling is used for indicating an initial access resource set corresponding to a plurality of controlled devices, and the initial access resource set includes the initial access resource. Optionally, the initial access resources in the initial access resource set are in one-to-one correspondence with the plurality of controlled devices, and the initial access resources of the plurality of controlled devices are multiplexed in time division, frequency division or code division.

Example 3

The controlled device determines at least one initial access resource according to pre-configuration information, and the controlled device determines the initial access resource from the at least one initial access resource.

Accordingly, for the respective controlling device, in Example 3, the controlling device sends the pre-configuration information to the controlled device, the pre-configuration information is used for configuring the at least one initial access resource, and the at least one initial access resource is used by the controlled device to determine the initial access resource therefrom.

Optionally, the controlled device determines the initial access resource from the at least one initial access resource according to the identity of the controlled device.

For example, the initial access resource is associated with the identity of the controlled device in terms of at least one of time domain, frequency domain, and code domain.

Optionally, in Example 3, the at least one initial access resource corresponds to the plurality of controlled devices controlled by the controlling device, respectively, and the at least one initial access resource is located within a first time in time domain.

Optionally, the first time is pre-configured or agreed in protocol, or the first time is configured by the controlling device.

For example, in Example 3, the initial access resources available to all controlled devices form an initial access resource set, and the time domain positions of the initial access resources in the set should be located within a specific time range. For example, the resources of all controlled devices are all located in the first P system frames within a system frame period (1024 system frames), and the controlled device determines a value of P according to the pre-configuration or the configuration of the controlling device.

Optionally, in the solutions corresponding to Examples 1 to 3, in a case where the access feedback information is carried by the downlink control channel, or, in a case where the access feedback information is jointly carried by the downlink control channel and the downlink data channel, and the downlink data channel is indicated by the downlink control channel, CRC of the downlink control channel is scrambled by the identity or the member index of the controlled device.

Optionally, in the solutions corresponding to Examples 1 to 3, in a case where the access feedback information is carried by the downlink data channel and the downlink data channel is not indicated by a corresponding downlink control channel, a resource of the downlink data channel is uniquely determined by the initial access resource, and/or, a default value is adopted for at least one of the modulation and coding scheme, the transmission power, and the multi-antenna transmission mode of the downlink data channel.

Optionally, the default value is pre-configured or agreed in protocol, or the default value is configured by the controlling device.

Optionally, in the solutions corresponding to Examples 1 to 3, the initial access information includes at least one of the following information:

the identity of the controlled device, a status of the controlled device, and a Buffer Status Report (BSR) of the controlled device.

Example 4

The controlled device sends an initial access scheduling request to the controlling device on a scheduling request resource, the controlled device receives resource configuration information sent by the controlling device, and the controlled device determines the initial access resource according to the resource configuration information.

Accordingly, for the respective controlling device, in Example 4, the controlling device receives the initial access scheduling request sent by the controlled device on the scheduling request resource, and in response to the initial access scheduling request, the controlling device sends the resource configuration information for configuring the initial access resource to the controlled device.

It should be noted that each scheduling request resource corresponds to a specific symbol sequence in a certain specific time-frequency domain, and scheduling request resources that may be selectable for the controlled device are indicated by the controlling device through a broadcast message. In addition, a time when there is the scheduling request resource is called a scheduling request transmit opportunity.

Optionally, in Example 4, the initial access scheduling request is carried by a symbol sequence.

Optionally, in Example 4, the symbol sequence is a pseudo-random sequence (PN sequence) or a Zadoff-Chu (ZC) sequence.

Optionally, in Example 4, the scheduling request resource is indicated by the controlling device through the broadcast message.

Optionally, in Example 4, the scheduling request resource is configured periodically, at least one scheduling request resource for the controlled device is included in each period, and the at least one scheduling request resource includes the scheduling request resource. That is to say, in each scheduling request resource configuration period, the controlled device may have one or more optional scheduling request resources. For each scheduling request resource, there is a scheduling request resource ID corresponding thereto, and the resource ID is configured by the controlling device. In addition, the controlled device can only send the scheduling request at the scheduling request transmit opportunity, and a resource for sending the scheduling request is randomly selected by the controlled device.

Optionally, in Example 4, the controlled device receives the resource configuration information by detecting a downlink control channel scrambled by an identity of the scheduling request resource in a first search space.

Optionally, the first search space is configured by the controlling device.

Optionally, in the solution corresponding to Example 4, in a case where the access feedback information is carried by the downlink control channel, or, in a case where the access feedback information is jointly carried by the downlink control channel and the downlink data channel, and the downlink data channel is indicated by the downlink control channel, CRC of the downlink control channel is scrambled by a specific identity used to uniquely determine the controlled device, or CRC of the downlink control channel is scrambled by the identity of the scheduling request resource.

Optionally, the specific identity is the identity of the controlled device, or the specific identity is a random number generated by the controlled device.

Example 5

The controlled device selects the initial access resource from the initial access resource set.

For example, the controlled device randomly selects the initial access resource from the initial access resource set.

Accordingly, for the respective controlling device, in Example 5, the controlling device configures the initial access resource set for the controlled device, and the initial access resource set is used by the controlled device to select the initial access resource therefrom.

Optionally, in Example 5, the initial access resource set is configured periodically, at least one initial access resource for the controlled device is included in each period, and the at least one initial access resource includes the initial access resource.

It should be noted that, for each initial access resource, there is a resource ID corresponding thereto, and the resource ID is configured by the controlling device.

Optionally, in Example 5, the initial access information is carried by the uplink data channel, and a scrambling sequence and/or a Demodulation Reference Signal (DMRS) sequence of the uplink data channel is at least generated based on an identity of the initial access resource.

Optionally, in the solution corresponding to Example 5, in a case where the access feedback information is carried by the downlink control channel, or, in a case where the access feedback information is jointly carried by the downlink control channel and the downlink data channel, and the downlink data channel is indicated by the downlink control channel, CRC of the downlink control channel is scrambled by the specific identity used to uniquely determine the controlled device, or CRC of the downlink control channel is scrambled by the identity of the initial access resource.

Optionally, the specific identity is the identity of the controlled device, or the specific identity is a random number generated by the controlled device.

Optionally, in Example 4 and Example 5, the initial access information includes at least the specific identity used to uniquely determine the controlled device. In addition, the initial access information may further include the status of the controlled device and/or BSR of the controlled device.

Therefore, in embodiments of the present disclosure, the controlled device sends the initial access information to the controlling device on the initial access resource, and monitors the access feedback information sent by the controlling device, so as to realize the initial access. That is, the controlled device can realize the initial access in the short-range communications without relying on the PRACH preamble, so as to avoid the disadvantages of establishing the initial connection through PRACH, shorten the establishment latency of the initial connection, reduce the cost of the controlled device and the controlling device, and improve the utilization of wireless resources.

Method embodiments of the present disclosure are described in detail above with reference to FIG. 5, and device embodiments of the present disclosure are described in detail below with reference to FIGS. 6 to 10. It should be understood that the device embodiments and the method embodiments correspond to each other, and for similar descriptions, reference may be made to the method embodiments.

Figure 6:
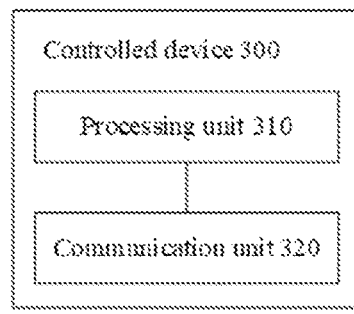
FIG. 6 is a schematic block diagram of a controlled device provided according to an embodiment of the present disclosure.

FIG. 6 shows a schematic block diagram of a controlled device 300 according to an embodiment of the present disclosure. As shown in FIG. 6, the controlled device 300 includes:

a processing unit 310, configured to acquire an initial access resource; and a communication unit 320, configured to send initial access information to a controlling device on the initial access resource, the communication unit 320 is further configured to monitor access feedback information sent by the controlling device, wherein the access feedback information is used for indicating that the controlling device has been successfully accessed by the controlled device.

Optionally, the initial access resource includes an uplink data channel resource or an uplink control channel resource, wherein the uplink data channel resource and the uplink control channel resource are different from each other in terms of at least one of a physical resource granularity, a modulation and coding scheme, a spreading mode, and a reference signal pattern.

Optionally, the processing unit 310 is specifically configured to: determine the initial access resource according to signaling sent by the controlling device.

Optionally, the processing unit 310 is specifically configured to: determine at least one search space according to the signaling sent by the controlling device in a broadcast mode; and determine the initial access resource by detecting a downlink control channel in the at least one search space.

Optionally, the processing unit 310 is specifically configured to:

in a case where CRC of the downlink control channel is scrambled by an identity of the controlled device, determine an uplink resource indicated in the downlink control channel as the initial access resource; or, in a case where the CRC of the downlink control channel is scrambled by an identity of a type group to which the controlled device belongs, determine an uplink resource, among M uplink resources indicated in the downlink control channel, corresponding to a member index of the controlled device as the initial access resource, where M is the number of members included in the type group, and the M uplink resources are in one-to-one correspondence with member indexes in the type group.

Optionally, the processing unit 310 is specifically configured to: determine the initial access resource according to the signaling sent by the controlling device in a broadcast mode.

Optionally, an interval between a time domain position where the signaling is received by the controlled device and a start position of the initial access resource in time domain is greater than a first threshold and less than a second threshold.

Optionally, the controlled device includes a plurality of time division initial access resources between the first threshold and the second threshold.

Optionally, the first threshold and the second threshold are pre-configured or agreed in protocol, or the first threshold and the second threshold are configured by the controlling device.

Optionally, the signaling is used for indicating an initial access resource set corresponding to a plurality of controlled devices, and the initial access resource set includes the initial access resource.

Optionally, initial access resources in the initial access resource set are in one-to-one correspondence with the plurality of controlled devices, and the initial access resources of the plurality of controlled devices are multiplexed in time division, frequency division or code division.

Optionally, the processing unit 310 is specifically configured to: determine, at least one initial access resource according to pre-configuration information; and determine the initial access resource from the at least one initial access resource.

Optionally, the processing unit 310 is specifically configured to: determine the initial access resource from the at least one initial access resource according to an identity of the controlled device.

Optionally, the initial access resource is associated with the identity of the controlled device in terms of at least one of time domain, frequency domain, and code domain.

Optionally, the at least one initial access resource corresponds to a plurality of controlled devices controlled by the controlling device, respectively, and the at least one initial access resource is located within a first time in time domain.

Optionally, the first time is pre-configured or agreed in protocol, or the first time is configured by the controlling device.

Optionally, in a case where the access feedback information is carried by the downlink control channel, or, in a case where the access feedback information is jointly carried by the downlink control channel and a downlink data channel, and the downlink data channel is indicated by the downlink control channel, CRC of the downlink control channel is scrambled by the identity or the member index of the controlled device.

Optionally, in a case where the access feedback information is carried by a downlink data channel and the downlink data channel is not indicated by a corresponding downlink control channel, a resource of the downlink data channel is uniquely determined by the initial access resource, and/or, a default value is adopted for at least one of the modulation and coding scheme, the transmission power, and the multi-antenna transmission mode of the downlink data channel.

Optionally, the default value is pre-configured or agreed in protocol, or the default value is configured by the controlling device.

Optionally, the initial access information includes at least one of the following information: the identity of the controlled device, a status of the controlled device, and BSR of the controlled device.

Optionally, the processing unit 310 is specifically configured to:

control the communication unit 320 to send an initial access scheduling request to the controlling device on a scheduling request resource;

control the communication unit 320 to receive resource configuration information sent by the controlling device; and determine the initial access resource according to the resource configuration information.

Optionally, the initial access scheduling request is carried by a symbol sequence.

Optionally, the symbol sequence is a pseudo-random sequence or a ZC sequence.

Optionally, the scheduling request resource is indicated by the controlling device through a broadcast message.

Optionally, the scheduling request resource is configured periodically, wherein at least one scheduling request resource for the controlled device is included in each period, and the at least one scheduling request resource includes the scheduling request resource.

Optionally, the communication unit 320 is specifically configured to: receive the resource configuration information by detecting a downlink control channel scrambled by an identity of the scheduling request resource in a first search space.

Optionally, the first search space is configured by the controlling device.

Optionally, in a case where the access feedback information is carried by the downlink control channel, or, in a case where the access feedback information is jointly carried by the downlink control channel and a downlink data channel, and the downlink data channel is indicated by the downlink control channel, CRC of the downlink control channel is scrambled by a specific identity used to uniquely determine the controlled device, or CRC of the downlink control channel is scrambled by the identity of the scheduling request resource.

Optionally, the processing unit 310 is specifically configured to: select the initial access resource from an initial access resource set.

Optionally, the initial access resource set is configured periodically, wherein at least one initial access resource for the controlled device is included in each period, and the at least one initial access resource includes the initial access resource.

Optionally, the initial access information is carried by an uplink data channel, and a scrambling sequence and/or a DMRS sequence of the uplink data channel are/is generated at least according to an identity of the initial access resource.

Optionally, in a case where the access feedback information is carried by a downlink control channel, or, in a case where the access feedback information is jointly carried by the downlink control channel and a downlink data channel, and the downlink data channel is indicated by the downlink control channel, CRC of the downlink control channel is scrambled by a specific identity used to uniquely determine the controlled device, or CRC of the downlink control channel is scrambled by an identity of the initial access resource.

Optionally, the initial access information includes at least the specific identity used to uniquely determine the controlled device.

Optionally, the specific identity is an identity of the controlled device, or the specific identity is a random number generated by the controlled device.

Optionally, the processing unit 310 is further configured to determine a transmission mode of the initial access information. The transmission mode of the initial access information includes at least one of the following: the modulation and coding scheme, the transmission power, the multi-antenna transmission mode.

Optionally, the transmission mode of the initial access information is pre-configured or agreed in protocol, or the transmission mode of the initial access information is configured by the controlling device.

Optionally, the processing unit 310 is further configured to determine whether to retransmit the initial access information according to HARQ feedback information for the initial access information sent by the controlling device.

Optionally, the communication unit 310 is specifically configured to: continuously send the initial access information to the controlling device R times on the initial access resource, where R is a positive integer.

Optionally, R is pre-configured or agreed in protocol, or R is configured by the controlling device.

Optionally, the access feedback information is carried by the downlink data channel and/or the downlink control channel. The downlink data channel and the downlink control channels are different from each other in terms of at least one of a physical resource granularity, a modulation and coding scheme, a spreading mode, and a reference signal pattern.

Optionally, the access feedback information includes one of the following:
  HARQ feedback information for an uplink control channel or an uplink data channel carrying the initial access information;
  uplink or downlink resource indication information for the controlled device;
  RRC layer configuration information for the controlled device; and
  non-access stratum information for the controlled device.

Optionally, in some embodiments, the aforementioned communication unit may be a communication interface or a transceiver, or an input/output interface of a communication chip or a system-on-chip. The aforementioned processing unit may be one or more processors.

It should be understood that the controlled device 300 according to embodiments of the present disclosure may correspond to the controlled device in the method embodiments of the present disclosure, and the abovementioned and other operations and/or functions of each unit in the controlled device 300 are to implement the respective flows of the controlled device in the method 200 shown in FIG. 5, respectively, and will not be repeated here for brevity.

Figure 7:
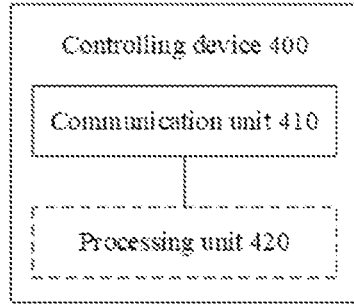
FIG. 7 is a schematic block diagram of a controlling device provided according to an embodiment of the present disclosure.

FIG. 7 shows a schematic block diagram of a controlling device 400 according to an embodiment of the present disclosure. As shown in FIG. 7, the controlling device 400 includes: a communication unit 410, configured to receive initial access information sent by a controlled device on an initial access resource.

The communication unit 410 is further configured to send access feedback information to the controlled device, where the access feedback information is used for indicating that the controlling device has been successfully accessed by the controlled device.

Optionally, the initial access resource includes an uplink data channel resource or an uplink control channel resource, where the uplink data channel resource and the uplink control channel resource are different from each other in terms of at least one of a physical resource granularity, a modulation and coding scheme, a spreading mode, and a reference signal pattern.

Optionally, the controlling device 400 further includes: a processing unit 420, configured to determine the initial access resource.

Optionally, the communication unit 410 is further configured to send signaling for determining the initial access resource to the controlled device.

Optionally, the communication unit 410 is further configured to send the signaling to the controlled device in a broadcast mode. The signaling is used by the controlled device to determine at least one search space, the at least one search space is used by the controlled device to detect a downlink control channel, and the initial access resource is indicated by the downlink control channel.

Optionally, in a case where CRC of the downlink control channel is scrambled by an identity of the controlled device, an uplink resource indicated in the downlink control channel is the initial access resource.

Alternatively, in a case where CRC of the downlink control channel is scrambled by an identity of a type group to which the controlled device belongs, an uplink resource, among M uplink resources indicated in the downlink control channel, corresponding to a member index of the controlled device is the initial access resource. M is the number of members included in the type group, and the M uplink resources are in one-to-one correspondence with member indexes in the type group.

Optionally, the communication unit 410 is further configured to send the signaling to the controlled device in a broadcast mode, where the signaling is used by the controlled device to determine the initial access resource that is semi-statically configured.

Optionally, an interval between a time domain position where the signaling is received by the controlled device and a start position of the initial access resource in time domain is greater than a first threshold and less than a second threshold.

Optionally, the controlled device includes a plurality of time division initial access resources between the first threshold and the second threshold.

Optionally, the first threshold and the second threshold are pre-configured or agreed in protocol, or the first threshold and the second threshold are configured by the controlling device.

Optionally, the signaling is used for indicating an initial access resource set corresponding to a plurality of controlled devices, and the initial access resource set includes the initial access resource.

Optionally, initial access resources in the initial access resource set are in one-to-one correspondence with the plurality of controlled devices, and the initial access resources of the plurality of controlled devices are multiplexed in time division, frequency division or code division.

Optionally, the communication unit 410 is further configured to send pre-configuration information to the controlled device. The pre-configuration information is used for configuring at least one initial access resource, and the at least one initial access resource is used by the controlled device to determine the initial access resource therefrom.

Optionally, the at least one initial access resource is specifically used by the controlled device to determine the initial access resource therefrom according to an identity of the controlled device.

Optionally, the initial access resource is associated with the identity of the controlled device in terms of at least one of time domain, frequency domain, and code domain.

Optionally, the at least one initial access resource corresponds to a plurality of controlled devices controlled by the controlling device, respectively, and the at least one initial access resource is located within a first time in time domain.

Optionally, the first time is pre-configured or agreed in protocol, or the first time is configured by the controlling device.

Optionally, in a case where the access feedback information is carried by the downlink control channel, or, in a case where the access feedback information is jointly carried by the downlink control channel and a downlink data channel, and the downlink data channel is indicated by the downlink control channel, CRC of the downlink control channel is scrambled by the identity or the member index of the controlled device.

Optionally, in a case where the access feedback information is carried by a downlink data channel and the downlink data channel is not indicated by a corresponding downlink control channel, a resource of the downlink data channel is uniquely determined by the initial access resource, and/or, a default value is adopted for at least one of the modulation and coding scheme, the transmission power, and the multi-antenna transmission mode of the downlink data channel.

Optionally, the default value is pre-configured or agreed in protocol, or the default value is configured by the controlling device.

Optionally, the initial access information includes at least one of the following information: the identity of the controlled device, a status of the controlled device, and BSR of the controlled device.

Optionally, the communication unit 410 is further configured to receive an initial access scheduling request sent by the controlled device on a scheduling request resource; and the communication unit 410 is further configured to send resource configuration information for configuring the initial access resource to the controlled device.

Optionally, the initial access scheduling request is carried by a symbol sequence.

Optionally, the symbol sequence is a pseudo-random sequence or a ZC sequence.

Optionally, the scheduling request resource is indicated by the controlling device through a broadcast message.

Optionally, the scheduling request resource is configured periodically. At least one scheduling request resource for the controlled device is included in each period, and the at least one scheduling request resource includes the scheduling request resource.

Optionally, the communication unit 410 is specifically configured to: send the resource configuration information through a downlink control channel in a first search space, where the resource configuration information is scrambled by an identity of the scheduling request resource.

Optionally, the first search space is configured by the controlling device.

Optionally, in a case where the access feedback information is carried by the downlink control channel, or, in a case where the access feedback information is jointly carried by the downlink control channel and a downlink data channel, and the downlink data channel is indicated by the downlink control channel, CRC of the downlink control channel is scrambled by a specific identity used to uniquely determine the controlled device, or CRC of the downlink control channel is scrambled by the identity of the scheduling request resource.

Optionally, the controlling device 400 further includes: a processing unit 420, configured to configure an initial access resource set for the controlled device, where the initial access resource set is used by the controlled device to select the initial access resource therefrom.

Optionally, the initial access resource set is configured periodically. At least one initial access resource for the controlled device is included in each period, and the at least one initial access resource includes the initial access resource.

Optionally, the initial access information is carried by an uplink data channel, and a scrambling sequence and/or a DMRS sequence of the uplink data channel are/is generated at least according to an identity of the initial access resource.

Optionally, in a case where the access feedback information is carried by a downlink control channel, or, in a case where the access feedback information is jointly carried by the downlink control channel and a downlink data channel, and the downlink data channel is indicated by the downlink control channel, CRC of the downlink control channel is scrambled by a specific identity used to uniquely determine the controlled device, or CRC of the downlink control channel is scrambled by the identity of the initial access resource.

Optionally, the initial access information includes at least the specific identity used to uniquely determine the controlled device.

Optionally, the specific identity is an identity of the controlled device, or the specific identity is a random number generated by the controlled device.

Optionally, the controlling device 400 further includes: a processing unit 420, configured to configure a transmission mode of the initial access information. The transmission mode of the initial access information includes at least one of the following: the modulation and coding scheme, the transmission power, the multi-antenna transmission mode.

Optionally, the transmission mode of the initial access information is pre-configured or agreed in protocol, or the transmission mode of the initial access information is configured by the controlling device.

Optionally, the communication unit 410 is further configured to send HARQ feedback information for the initial access information to the controlled device. The HARQ feedback information is used by the controlled device to determine whether to retransmit the initial access information.

Optionally, the communication unit 410 is further configured to receive the initial access information continuously sent by the controlled device R times on the initial access resource, where R is a positive integer.

Optionally, R is pre-configured or agreed in protocol, or R is configured by the controlling device.

Optionally, the access feedback information is carried by the downlink data channel and/or the downlink control channel. The downlink data channel and the downlink control channels are different from each other in terms of at least one of a physical resource granularity, a modulation and coding scheme, a spreading mode, and a reference signal pattern.

Optionally, the access feedback information includes one of the following:
  HARQ feedback information for an uplink control channel or an uplink data channel carrying the initial access information;
  uplink or downlink resource indication information for the controlled device;
  RRC layer configuration information for the controlled device; and
  non-access stratum information for the controlled device.

Optionally, in some embodiments, the aforementioned communication unit may be a communication interface or a transceiver, or an input/output interface of a communication chip or a system-on-chip. The aforementioned processing unit may be one or more processors.

It should be understood that the controlling device 400 according to embodiments of the present disclosure may correspond to the controlling device in the method embodiments of the present disclosure, and the abovementioned and other operations and/or functions of each unit in the controlling device 400 are to implement the respective flows of the controlling device in the method 200 shown in FIG. 5, respectively, and will not be repeated here for brevity.

Figure 8:
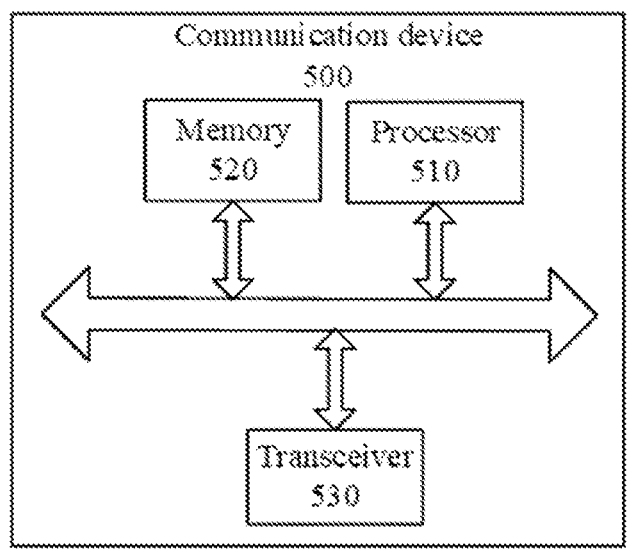
FIG. 8 is a schematic block diagram of a communication device provided according to an embodiment of the present disclosure.

FIG. 8 is a schematic structural diagram of a communication device 500 provided by an embodiment of the present disclosure. The communication device 500 shown in FIG. 8 includes a processor 510. The processor 510 may call a computer program from a memory and run the computer program, to implement the method in embodiments of the present disclosure.

Optionally, as shown in FIG. 8, the communication device 500 may further include a memory 520. The processor 510 may call the computer program from the memory 520 and run the computer program, to implement the method in embodiments of the present disclosure.

The memory 520 may be a separate component independent of the processor 510, or may be integrated into the processor 510.

Optionally, as shown in FIG. 8, the communication device 500 may further include a transceiver 530. The processor 510 may control the transceiver 530 to communicate with another device. Specifically, the transceiver 530 may transmit information or data to another device, or receive information or data transmitted by another device.

The transceiver 530 may include a transmitter and a receiver. The transceiver 530 may further include an antenna. There may be one or more antennas.

Optionally, the communication device 500 may be the controlling device in embodiments of the present disclosure, and the communication device 500 may implement respective procedures performed by the controlling device in various methods according to embodiments of the present disclosure. For brevity, details are not described herein again.

Optionally, the communication device 500 may be the controlled device in embodiments of the present disclosure, and the communication device 500 may implement respective procedures performed by the controlled device in various methods according to embodiments of the present disclosure. For brevity, details are not described herein again.

Figure 9:
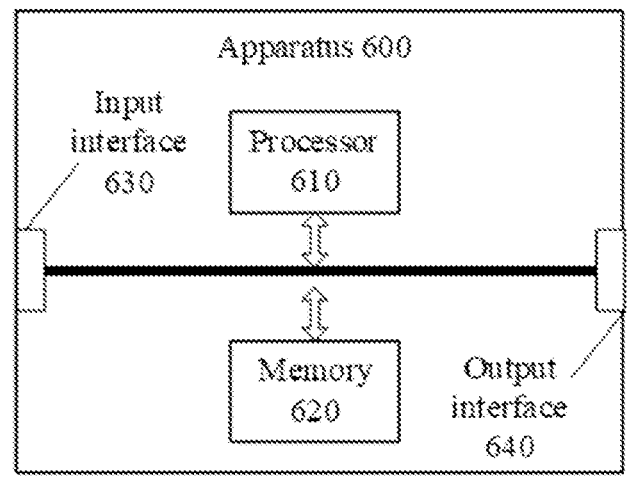
FIG. 9 is a schematic block diagram of an apparatus provided according to an embodiment of the present disclosure.

FIG. 9 is a schematic structural diagram of an apparatus 600 according to an embodiment of the present disclosure. The apparatus 600 shown in FIG. 9 includes a processor 610 which can call and run a computer program from a memory to implement the method according to embodiments of the present disclosure.

Optionally, as shown in FIG. 9, the apparatus 600 may further include a memory 620. The processor 610 can call and run the computer program from the memory 620 to carry out the method in embodiments of the present disclosure.

The memory 620 may be a separate device independent of the processor 610, or may be integrated in the processor 610.

Optionally, the apparatus 600 may further include an input interface 630. The processor 610 can control the input interface 630 to communicate with other devices or chips, and specifically, to acquire information or data transmitted by other devices or chips.

Optionally, the apparatus 600 may further include an output interface 640. The processor 610 can control the output interface 640 to communicate with other devices or chips, and specifically, to output information or data to other devices or chips.

Optionally, the apparatus may be applied to the controlling device in embodiments of the present disclosure, and the apparatus can implement respective procedures performed by the controlling device in various methods according to embodiments of the present disclosure. For brevity, details are not described herein again.

Optionally, the apparatus may be applied to the controlled device in embodiments of the present disclosure, and the apparatus can implement respective procedures performed by the controlled device in various methods according to embodiments of the present disclosure. For brevity, details are not described herein again.

Optionally, the apparatus mentioned in embodiments of the present disclosure may also be a chip, which may be, for example, a system-level chip, a system chip, a chip system, or a system-on-chip.

Figure 10:
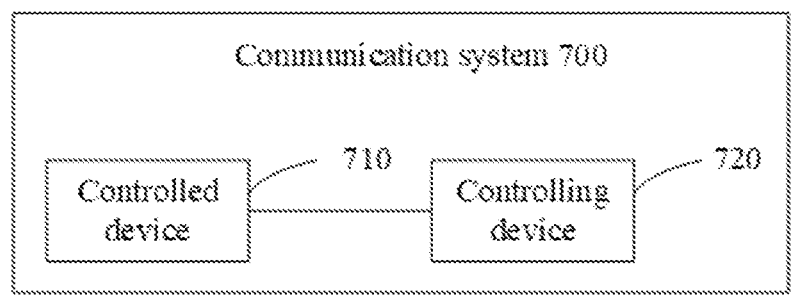
FIG. 10 is a schematic block diagram of a communication system provided according to an embodiment of the present disclosure.

FIG. 10 is a schematic block diagram of a communication system 700 provided by an embodiment of the present disclosure. As shown in FIG. 10, the communication system 700 includes a controlled device 710 and a controlling device 720.

The controlled device 710 may be configured to implement respective functions performed by the controlled device in the above method, and the controlling device 720 may be configured to implement respective functions performed by the controlling device in the above method. For brevity, details are not described herein again.

It is to be understood that the processor in embodiments of the present disclosure may be an integrated circuit chip and has a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or other programmable logical device, a discrete gate or a transistor logical device, or a discrete hardware component. The processor may implement or execute each method, operation and logical block diagram disclosed in embodiments of the present disclosure. The universal processor may be a microprocessor, or the processor may also be any conventional processor and the like. The operations of the method disclosed in combination with embodiments of the present disclosure may be directly embodied as being executed and completed by a hardware decoding processor or executed and completed by a combination of hardware and software modules in the decoding processor. The software module may be located in a mature storage medium in this field, such as a Random Access Memory (RAM), a flash memory, a Read-Only memory (ROM), a Programmable ROM (PROM) or Electrically Erasable PROM (EEPROM) and a register. The storage medium is located in a memory. The processor reads information in the memory, and completes operations of the methods in combination with hardware.

It can be understood that the memory in embodiments of the present disclosure may be a volatile memory or a nonvolatile memory, or may include both the volatile and nonvolatile memories. The nonvolatile memory may be a ROM, a PROM, an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the present disclosure is intended to include, but not limited to, memories of these and any other proper types.

It should be understood that the foregoing memory is exemplary rather than limiting. For example, the memory in embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in embodiments of the present disclosure is intended to include but is not limited to those and any other suitable types of memories.

Embodiments of the present disclosure further provide a computer readable storage medium. The computer readable storage medium is configured to store a computer program.

Optionally, the computer readable storage medium may be applied to the controlling device in embodiments of the present disclosure, and the computer program enables a computer to execute respective processes implemented by the controlling device in various methods of embodiments of the present disclosure. For brevity, details are not described herein again.

Optionally, the computer readable storage medium may be applied to the controlled device in embodiments of the present disclosure, and the computer program enables the computer to execute respective processes implemented by the controlled device in various methods of embodiments of the present disclosure. For brevity, details are not described herein again.

Embodiments of the present disclosure further provide a computer program product. The computer program product includes computer program instructions.

Optionally, the computer program product may be applied to the controlling device in embodiments of the present disclosure, and the computer program instructions enable a computer to execute respective processes implemented by the controlling device in various methods of embodiments of the present disclosure. For brevity, details are not described herein again.

Optionally, the computer program product may be applied to the controlled device in embodiments of the present disclosure, and the computer program instructions enable the computer to execute respective processes implemented by the controlled device in various methods of embodiments of the present disclosure. For brevity, details are not described herein again.

The embodiments of the present disclosure further provide a computer program.

Optionally, the computer program may be applied to the controlling device in embodiments of the present disclosure. When run on a computer, the computer program enables a computer to execute respective processes implemented by the controlling device in various methods of embodiments of the present disclosure. For brevity, details are not described herein again.

Optionally, the computer program may be applied to the controlled device in embodiments of the present disclosure. When run on a computer, the computer program enables the computer to execute respective processes implemented by the controlled device in various methods of embodiments of the present disclosure. For brevity, details are not described herein again.

Those of ordinary skill in the art will appreciate that the exemplary units and algorithm steps described according to embodiments disclosed herein may be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by a person skilled in the art that, for the purpose of convenient and brief description, with respect to a detailed working process of the system, device, and unit, reference may be made to a corresponding process in the foregoing method embodiments. Details are not described herein again.

According to embodiments provided by the present disclosure, it should be understood that the disclosed systems, devices and methods may be implemented in other ways. For example, the device embodiments described above are merely illustrative. For example, the division of units is only a kind of logical function division. In practice, other division may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units. That is, the units may be located in one place, or may be distributed over multiple network units. Some or all of the units may be selected according to actual needs to achieve the objectives of the solutions in embodiments.

In addition, individual functional units in each embodiment of the present disclosure may be integrated in one processing unit, or the units may exist alone physically, or two or more units may be integrated in one unit.

The functions may also be stored in a computer-readable storage medium if being implemented in the form of software functional unit and sold or used as an independent product. Based on such understanding, the essence of the technical solutions of the present disclosure, or the part contributing to the prior art or part of the technical solutions, may be embodied in the form of software product. The computer software product is stored in a storage medium including a number of instructions such that a computer device (which may be a personal computer, a server, or a controlling device, etc.) performs all or part of steps of the method described in each embodiment of the present disclosure. The foregoing storage medium includes any medium that is capable of storing program codes, such as a USB disk, a mobile hard disk, a Read-Only Memory (ROM), a Random Access Memory (RAM), a magnetic disk or an optical disk, and the like.

The foregoing descriptions are merely specific embodiments of the present disclosure, but the protection scope of the present disclosure is not limited thereto. Any person skilled in the art can easily think of changes or substitutions within the technical scope disclosed by the present disclosure. Therefore, the protection scope of the present disclosure should be defied by the appended claims.

What is claimed is:

1. An initial access method, comprising:
   acquiring, by a controlled device, an initial access resource;
   sending, by the controlled device, initial access information to a controlling device on the initial access resource; and
   monitoring, by the controlled device, access feedback information sent by the controlling device, wherein the access feedback information is used for indicating that the controlling device has been successfully accessed by the controlled device,
   wherein the acquiring, by the controlled device, the initial access resource comprises:
   determining, by the controlled device, at least one initial access resource according to pre-configuration information; and
   determining, by the controlled device, the initial access resource from the at least one initial access resource,
   wherein the determining, by the controlled device, the initial access resource from the at least one initial access resource comprises:
   determining, by the controlled device, the initial access resource from the at least one initial access resource according to an identity of the controlled device, and
   wherein the initial access resource is associated with the identity of the controlled device in time domain.

2. The method according to claim 1, wherein the acquiring, by the controlled device, the initial access resource comprises:
   determining, by the controlled device, the initial access resource according to signaling sent by the controlling device.

3. The method according to claim 2, wherein the determining, by the controlled device, the initial access resource according to the signaling sent by the controlling device comprises:
   determining, by the controlled device, the initial access resource according to the signaling sent by the controlling device in a broadcast mode.

4. The method according to claim 2, wherein the signaling is used for indicating an initial access resource set corresponding to a plurality of controlled devices, and the initial access resource set comprises the initial access resource.

5. The method according to claim 2, wherein the initial access information comprises:
   the identity of the controlled device.

6. The method according to claim 1, wherein the acquiring, by the controlled device, the initial access resource comprises:
   selecting, by the controlled device, the initial access resource from an initial access resource set.

7. The method according to claim 6, wherein the initial access information comprises at least a specific identity used to uniquely determine the controlled device.

8. The method according to claim 7, wherein the specific identity is a random number generated by the controlled device.

9. The method according to claim 1, wherein the method further comprises:
   determining or configuring, by the controlled device, a transmission mode of the initial access information, wherein the transmission mode of the initial access information comprises at least one of:
   a modulation and coding scheme, a transmission power.

10. An initial access method, comprising:
- receiving, by a controlling device, initial access information sent by a controlled device on an initial access resource; and
- sending, by the controlling device, access feedback information to the controlled device, wherein the access feedback information is used for indicating that the controlling device has been successfully accessed by the controlled device,
- wherein the method further comprises:
- sending, by the controlling device, pre-configuration information to the controlled device, wherein the pre-configuration information is used for configuring at least one initial access resource, and the at least one initial access resource is used by the controlled device to determine the initial access resource therefrom.

11. The method according to claim 10, wherein the method further comprises:
- determining, by the controlling device, the initial access resource.

12. The method according to claim 10, wherein the method further comprises:
- sending, by the controlling device, signaling to the controlled device in a broadcast mode, wherein the signaling is used by the controlled device to determine the initial access resource that is semi-statically configured.

13. The method according to claim 12, wherein the signaling is used for indicating an initial access resource set corresponding to a plurality of controlled devices, and the initial access resource set comprises the initial access resource.

14. The method according to claim 10, wherein the method further comprises:
- configuring, by the controlling device, an initial access resource set for the controlled device, wherein the initial access resource set is used by the controlled device to select the initial access resource therefrom.

15. The method according to claim 10, wherein the method further comprises:
- determining or configuring, by the controlling device, a transmission mode of the initial access information, wherein the transmission mode of the initial access information comprises at least one of:
- a modulation and coding scheme, a transmission power.

16. A controlled device, comprising: a processor and a memory, wherein the memory is configured to store a computer program, and the processor is configured to call and run the computer program stored in the memory, to perform operations of:
- acquiring an initial access resource;
- sending initial access information to a controlling device on the initial access resource; and
- monitoring access feedback information sent by the controlling device, wherein the access feedback information is used for indicating that the controlling device has been successfully accessed by the controlled device,
- wherein the acquiring, by the controlled device, the initial access resource comprises:
- determining, by the controlled device, at least one initial access resource according to pre-configuration information; and
- determining, by the controlled device, the initial access resource from the at least one initial access resource,
- wherein the determining, by the controlled device, the initial access resource from the at least one initial access resource comprises:
- determining, by the controlled device, the initial access resource from the at least one initial access resource according to an identity of the controlled device, and
- wherein the initial access resource is associated with the identity of the controlled device in time domain.

* * * * *